(12) United States Patent
Schmidt

(10) Patent No.: US 10,342,324 B2
(45) Date of Patent: Jul. 9, 2019

(54) BRUSH AND METHOD FOR PRODUCING SAME

(71) Applicant: M+C Schiffer GmbH, Neustadt/Wied (DE)

(72) Inventor: Eric Schmidt, Waldbreitbach (DE)

(73) Assignee: M+C SCHIFFER GMBH, Neustadt/Wied (DE)

(\*) Notice: Subject to any disclaimer, the term of this patent is extended or adjusted under 35 U.S.C. 154(b) by 0 days.

(21) Appl. No.: 15/537,569

(22) PCT Filed: Dec. 17, 2015

(86) PCT No.: PCT/EP2015/080147
§ 371 (c)(1),
(2) Date: Jun. 19, 2017

(87) PCT Pub. No.: WO2016/097091
PCT Pub. Date: Jun. 23, 2016

(65) Prior Publication Data
US 2018/0153290 A1 Jun. 7, 2018

(30) Foreign Application Priority Data
Dec. 19, 2014 (EP) .................................... 14199116

(51) Int. Cl.
*A46D 3/04* (2006.01)
*A46B 3/06* (2006.01)

(52) U.S. Cl.
CPC ................ *A46B 3/06* (2013.01); *A46D 3/045* (2013.01)

(58) Field of Classification Search
CPC .................................. A46B 3/06; A46D 3/045
See application file for complete search history.

(56) References Cited

U.S. PATENT DOCUMENTS

| | | | | |
|---|---|---|---|---|
| 3,604,043 A | * | 9/1971 | Lewis, Jr. ................ | A46B 3/06 15/159.1 |
| 6,406,099 B2 | * | 6/2002 | Boucherie ................ | A46B 3/04 300/21 |

(Continued)

FOREIGN PATENT DOCUMENTS

| | | |
|---|---|---|
| DE | 19902129 A1 | 7/2000 |
| DE | 19962188 A1 | 9/2001 |

(Continued)

OTHER PUBLICATIONS

Computer generated English translation of WO 99/55194 A1, Mar. 1999, Rueb.*

(Continued)

*Primary Examiner* — Laura C Guidotti
(74) *Attorney, Agent, or Firm* — The Webb Law Firm

(57) ABSTRACT

The invention relates to a brush including a brush head body which includes a recess through which a bundle of bristles passes, the securing-side end of which is provided by means of a melt process with a thickened portion for securing the bundle of bristles to the brush head body, wherein the brush head body forms a collar which extends up to the thickened portion and circumferentially surrounds the bundle of bristles and which is provided at a distance from a brush head body surface projected over by the bundle of bristles at the use side, and is bonded to the thickened portion by means of a melting process.

8 Claims, 4 Drawing Sheets

(56) References Cited

U.S. PATENT DOCUMENTS 6,695,414 B2    2/2004   Meyer et al.
6,752,949 B2    6/2004   Collins et al.

FOREIGN PATENT DOCUMENTS

| DE | 102006051356 A1 | * | 5/2008 | ............... A46B 3/06 |
| DE | 102011017099 A1 | | 10/2012 | |
| WO | WO 99/55194 A1 | * | 3/1999 | ............. A46D 3/045 |

OTHER PUBLICATIONS

Computer generated English translation of DE 102006051356 A1, May 2008, Schubnell et al.*
Computer generated English translation of DE 102011017099 A1, Oct. 2012, Buchholz et al.*

* cited by examiner

BRUSH AND METHOD FOR PRODUCING SAME

CROSS-REFERENCE TO RELATED APPLICATIONS

This application is the United States national phase of PCT International Application No. PCT/EP2015/080147 filed Dec. 17, 2015, and claims priority to European Patent Application No. 14199116.6, filed Dec. 19, 2014, the disclosure of each of which is hereby incorporated by reference in its entirety.

BACKGROUND OF THE INVENTION

Field of the Invention

The present invention refers to a brush and a method for producing same.

Brushes are normally made from an injection-molded body which carries one or several bundles of bristles. While in former times the bundle of bristles was held by a metallic anchor in a recess previously introduced into the brush head body, recent methods for producing brushes sometimes suggest that the bundle of bristles should be provided with a thickened portion shaped by melting, which in the production of the brush head body by way of injection molding is normally introduced at a distance into a mold cavity of an injection mold and fused by liquid plastic which forms the brush head body.

Although the above-described technique allows the design of very thin brush head bodies, it entails various problems that are particularly caused by hot plastic being injected at a high pressure into a not fully completed mold cavity. This requires an exact procedure because, otherwise, the liquid plastic is pressed out through a mold cavity recess through which the bundle of bristles passes.

Faced with this problem, DE 199 62 188 A1, which goes back to the applicant, suggests for instance that the thickened portion should first of all be surrounded by a first bristle carrier which is produced at a low injection pressure and may thus have a relatively poor surface quality, and that this first bristle carrier should then be enveloped with a second plastic mass that satisfies optical and hygienic requirements.

DE 10 2011 017 099 A1 discloses a method for producing a tooth brush in which a brush body is produced by way of injection molding. A perforated plate is here used that comprises holes for holding a bundle of bristles. Support elements which partly surround said holes project from the inside of the perforated plate that faces the mold cavity. The support elements are provided distributed over the circumference in relation to the hole and are arranged at a circumferential distance relative to one another. Thus, the support elements leave free spaces between them, which free spaces are to be filled by the plastic to be injected into the mold cavity. A bundle of bristles which abuts on the end sides of the support elements with a thickened portion is thus correspondingly supported during injection molding of the base body of the brush at least in sections in circumferential direction so as to form spacers formed by the melt solidifying between the support elements. In the method a thickened portion is first of all provided on the bundle of bristles by way of melting. Subsequently, the bundle of bristles is introduced into the hole until the thickened portion abuts at the end side on the support elements. The bundle of bristles is thus arranged at a predetermined distance relative to the surface of the perforated plate and thus the surface of the brush head through which the bundles of bristles passes, and the brush head is then produced during sealing of the thickened portion.

U.S. Pat. No. 6,752,949 B2 discloses a method for producing a tooth brush in which a brush body is first produced by way of injection molding, said brush body comprising a blind hole for each bundle of bristles. In a holder, bundles of bristles are held corresponding to the arrangement of the blind holes on the brush bodies.

The securing-side end of the bundles of bristles is molten. Likewise, the brush body is heated in the area of the blind holes and locally molten. Subsequently, the bundles of bristles are respectively pushed into one of the blind holes via the holder with their thickened portions formed by way of melting. The diameter of the cylindrical blind holes is here greater than the diameter of the thickened portion, so that the plastic melt produced by heating can penetrate into an annular gap between the bundle of bristles and the brush body and solidifies there and bonds the bundle of bristles to the brush body.

The bundles of bristles which project into the mold cavity further run the risk of being entrained by the plastic mass that is injected into the mold cavity, but at any rate they run the risk of being changed in their position. Normally, however, the bundles of bristles are first of all to be produced with the desired length and topography and are only then to be secured to the brush head body by way of injection molding. A change in the position of the bundle of bristles is however not acceptable. DE 199 02 129 A1, which also goes back to the applicant, suggests that the mold cavity should be provided with flow barriers that project towards the thickened portion within the mold cavity and surround the bundle of bristles partly circumferentially at its securing-side end. These flow barriers are however part of the tool and must leave open the thickened portion at least in part, so that plastic mass can also abut on the thickened portion and can pass between the future brush head body surface, through which the bundle of bristles passes, and the thickened portion to fix the bundle of bristles with the necessary pullout strength in the brush head body. DE 10 2011 017 099 A1 discloses support elements which project inwards from the mold cavity surface and on which the thickened portion abuts during injection molding. These support elements are also provided distributed over the circumference of the bundle of bristles and extend up to the thickened portion, but leave free spaces between them, so that the molten plastic can pass up to the bundle of bristles.

SUMMARY OF THE INVENTION

In some examples, provided herein is a brush having a brush head body which comprises a recess through which a bundle of bristles passes, the securing-side end of which is provided by means of a melt process with a thickened portion for securing the bundle of bristles to the brush head body, wherein the brush head body forms a collar which extends up to the thickened portion and circumferentially surrounds the bundle of bristles and which is provided at a distance from a brush head body surface projected over by the bundle of bristles at the use side, and is bonded to the thickened portion by means of a melting process.

BRIEF DESCRIPTION OF THE DRAWINGS

The foregoing summary, as well as the detailed description, will be better understood when read in conjunction with the appended drawings. The present invention is described herein in greater detail using an embodiment and associated drawings. In the drawings.

DETAILED DESCRIPTION

Figure 1:
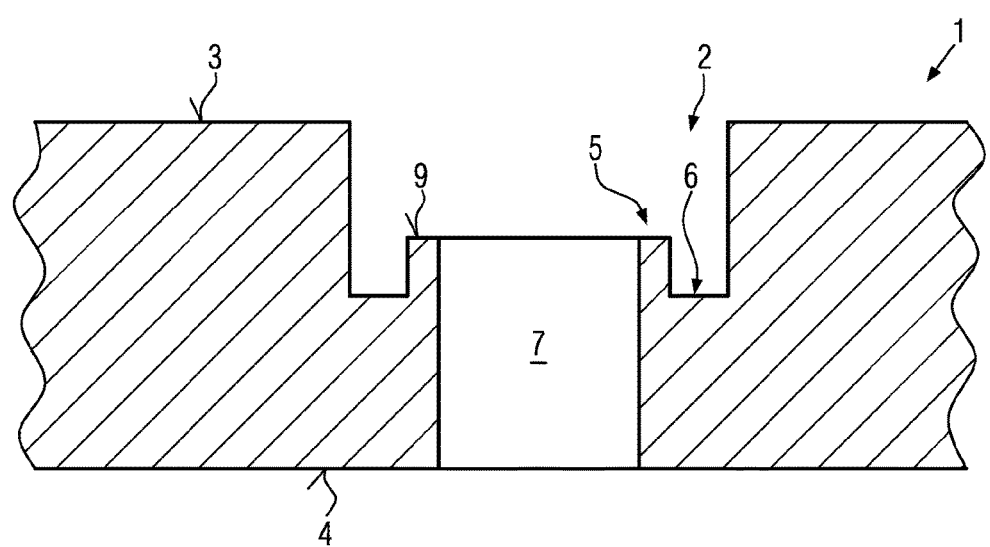
FIG. 1 shows a schematic sectional view of a part of a brush head body.

The present invention is based on the problem to indicate a brush which can be produced in a simple and inexpensive manner. The brush according to the invention shall particularly have a thin structure. Furthermore, the invention wants to indicate a method for producing such a brush.

To solve this problem, the present invention indicates a brush with the features of claim 1. This brush has a brush head body which comprises a recess. At least one recess of this type is provided in the brush head body. Several recesses may also be formed on the brush head body. The recesses are normally produced during the primary forming of the brush head body. It is here assumed that the brush head body is produced by way of injection molding from plastic. It is however possible to produce the brush head body in a different way, for instance from a semifinished product which is punched so as to form the one or plural recesses. The brush head body, however, normally consists of a material that is fusible at temperatures within the range of the melting temperature of polyamide, i.e. $T_s+/-200°$ C. That is, according to the present invention, the bundle of bristles is bonded by way of welding to the brush head body. To this end a thickened portion which is formed by way of melting is provided on the securing-side end of the bundle of bristles in a manner which is known per se. The thickened portion is thus a fused, but subsequently re-solidified portion of the bundle of bristles. Normally, the melting of the bundle of bristles at its securing-side end has the effect that a thickened portion is formed that radially projects over the real bundle of bristles and covers the bundle of filaments in the manner of a mushroom head.

The melt which is obtained during melting and consists of the material of the bundle of bristles is placed according to the present invention against a collar which surrounds the bundle of bristles circumferentially, but normally with a very narrow play, and which is shaped by the material of the brush head body. A collar in this sense need not necessarily project in the manner of a cylinder from a rear-side surface of the brush head body. Rather, the above-mentioned collar may also be part of a larger rear-side surface of the brush head body. A defined collar that normally has approximately an outer diameter corresponding to the outer diameter of the thickened portion formed by melting should however be preferred. Such a collar projects in the manner of a cylinder from the surface of the brush head body. The collar may have a free front side which is provided inwardly offset in relation to a rear-side surface of the brush head body, i.e. shifted towards a use-side surface through which the bundle of bristles passes. Owing to the material bond between the thickened portion and the collar the bundle of bristles is connected to the brush head body. This yields a pullout strength which meets practical requirements, so that the bundle of bristles is captively provided on the brush head body. This material bond is already enough for producing a brush on the whole. Thus, in its simple design the brush according to the invention just comprises the brush head body and the at least one bundle of bristles secured thereto in the inventive way. Thus, a very simple brush can be produced at low costs.

With a view to an attachment that is as firm as possible and also to a sealing of the bundle of bristles on its securing-side end relative to the brush head body, it is preferable to completely connect a front side formed by the collar to the thickened portion by way of melting. This yields a full sealing of the bundle of bristles on the collar and thus the brush head body.

Various configurations of the brush according to the invention are possible. With a view to an esthetic design that is as appealing as possible, the brush head body is provided with a coating on its rear side provided opposite a front side through which the bundle of bristles passes. This coating covers at least the molten portion of the bundle of bristles. The coating may be a soft elastic coating, for instance of TPE. A material which has a Shore A hardness of not more than 80 is regarded as the soft elastic coating. The brush head body is normally made from a hard component. This term describes a material selected from the group consisting of PP, PA, PET, ABS, PBT and PE. The brush head body may also integrally form grip portions of the brush. It can just as well be formed as a small plate and restricted to the region of the real brush head and connected to a separate handle for handling the brush. Particularly in the production of tooth brushes the brush head body normally forms a base body of a hard component which at any rate also partly forms the handle of the brush and is normally provided—at least on the rear side—with a coating formed by way of overmolding. This overmolding may be a hard component or a soft component. The molding process is carried out with the aim to provide a surface that is as flat as possible and without steps—also on the rear side of the brush—so that bacteria or dirt cannot accumulate therein.

If the collar projects as a separate component from the neighboring surface of the brush head body, it has a diameter preferably of not more than 1.4, preferably not more than 1.85 and particularly preferably of not more than 1.05 of the diameter of the collar. The collar must be filigree to be also molten during the relatively short melting process required by the thin filaments. The collar preferably has a conical outer circumferential surface which preferably tapers towards the free end of the collar. The inner diameter of the collar corresponds approximately to the outer diameter of the bundle of bristles, so that said bundle is narrowly enclosed in the recess also in the area of the collar.

The present invention further suggests a method for producing a brush of the above-mentioned type. In this method a brush head body is made from a plastic and is provided with at least one recess. As already mentioned, this recess may be provided during primary forming of the brush head body or however subsequently as a hole or a punching. A bundle of bristles is subsequently introduced into the recess. This bundle of bristles is molten on its securing-side end. The bundle of bristles is subsequently connected to the brush head body. The connection is normally a material bond which is preferably accomplished by melting the thickened portion and placing the melt produced thereby against the brush head body.

According to a preferred development of the present invention the securing-side end of the bundle of bristles is arranged prior to melting at a distance from a surface, for instance at a distance from a free front side of a collar formed on the brush head body, and melt produced during melting of the bundle of bristles is pushed against the free surface of the brush head body. This pushing of the melt can be generated by an internal force of the melt, for instance by the resetting of the melt due to a reorientation of the molecule chains of the stretched filaments, which form the bundle of bristles. It may however also be an external force, for instance an air flow which flows from the securing side against the bundle of bristles and the convection of which pushes the melt towards the collar.

According to a further preferred development of the method according to the invention the melt is pushed against the brush head body. To this end a punch is normally placed against the still molten thickened portion, the punch pressing the melt of the thickened portion against the brush head body, preferably a collar formed by the brush head body. This procedure improves the material bond between the brush head body and the bundle of bristles and enhances a possible tightness.

Figure 2:
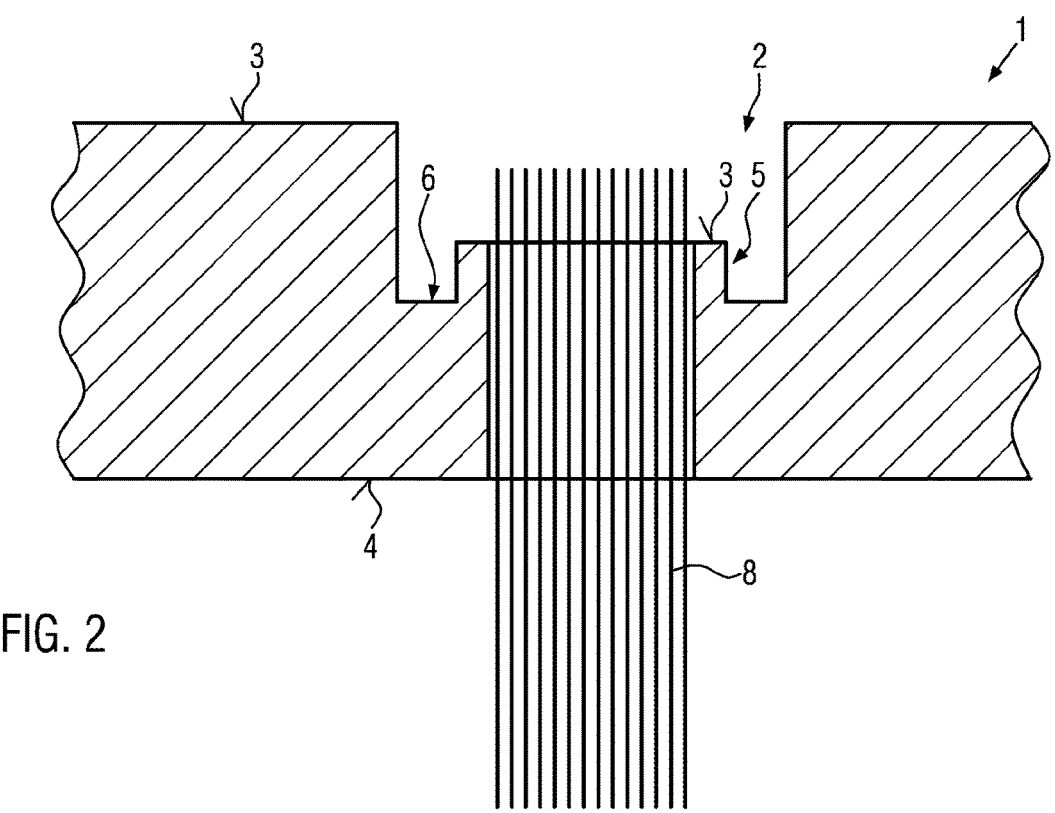
FIG. 2 shows the detail shown in FIG. 1 of the brush head body after introduction of a bundle of bristles.
Figure 3:
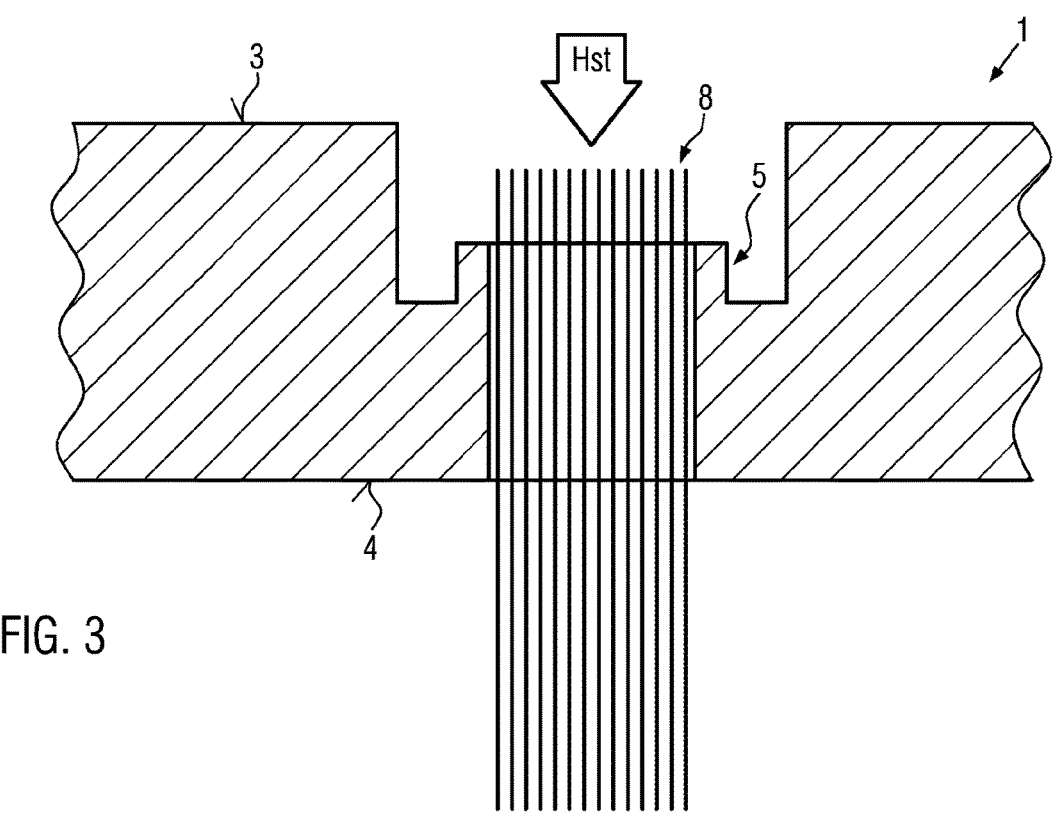
FIG. 3 highlights the embodiment shown in FIGS. 1 and 2 during melting of the bundle of bristles.
Figure 4:
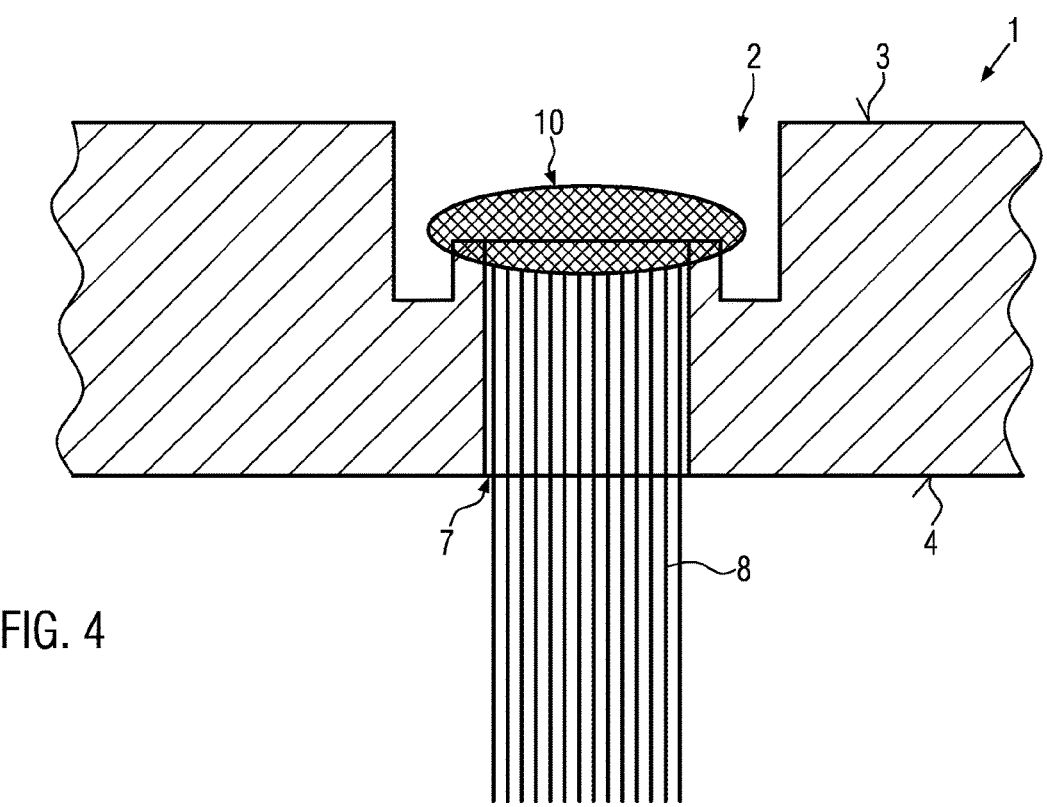
FIG. 4 shows the bundle of bristles after welding with the brush head body in the embodiment according to FIGS. 1 to 3.

Further details and advantages of the present invention will become apparent from the following description of an embodiment in conjunction with the drawing, in which:

FIG. 1 is a schematic sectional view of a part of a brush head body;

FIG. 2 shows the detail shown in FIG. 1 of the brush head body after introduction of a bundle of bristles;

FIG. 3 highlights the embodiment shown in FIGS. 1 and 2 during melting of the bundle of bristles, and FIG. 4 shows the bundle of bristles after welding with the brush head body in the embodiment according to FIGS. 1 to 3.

FIG. 1 shows a brush head body 1 in a sectional view. The brush head body 1 has a recess 2 which is inwardly offset relative to a rear side 3 and is thus provided between said rear side 3 and a front side 4. A collar 5 which is formed by the material of the brush head body 1 and which projects over a bottom 6 of the recess 2 towards the rear side 3 is located in the recess 2. Thus, the bottom 6 forms an annular gap around the collar 5. The collar 5 is part of a continuous recess 7 without steps that is recessed in the brush head body 1.

In the illustrated embodiment the brush head body 1 consists of a plastic component, for instance PP or PA.

In addition to the details according to FIG. 1, FIG. 2 shows a bundle of bristles 8 which is introduced into the recess 7. A securing-side end of the bundle of bristles 8 projects over a free front side 9 of the collar 5. The distance between the free end of the bundle of bristles 8 and the front side 9 of the collar is about 1 to 2.5 the diameter of the bundle of bristles 8. In the position shown in FIG. 2, the bundle of bristles 8 is now axially fixed, for instance by a holding plate which presses against the use-side end of the bundle of bristles.

FIG. 3 illustrates the process step of melting the bundle of bristles 8. For this purpose hot air flows in the illustrated embodiment with a flow S at the end side against the securing-side end of the bundle of bristles 8. The hot air fuses the bundle of bristles 8. Melt is developing in this process, the melt interconnecting neighboring filaments of the bundle of bristles 8 and also passing up to the collar 5. The hot air applied to the bundle of bristles 8 also heats the free front side 9 of the collar 5 and melts the same. This yields a welding between a thickened portion of the bundle of bristles 8, which thickened portion is designated by reference numeral 10, and the collar 5. The thickened portion 10 can also be produced by applying a hot plate or by the radiation heat of a strong light source.

As illustrated by FIG. 4, this yields a solid material bond between the bundle of bristles 8 and the brush head body 1. The brush is thereby produced in its basic shape. The rear side 3 can also be provided with a coating to cover the recess 2 and to produce a flat and esthetically appealing design also on the rear side of the future brush. On the finished product, the use-side end of the bundle of bristles 8 projects over the front side 4 of the brush head body 1. Owing to the material bond the bundle of bristles 8 is safely connected to the brush head body 1.

LIST OF REFERENCE NUMERALS

1 Brush head body
2 Recess
3 Rear side
4 Front side
5 Collar
6 Bottom
7 Recess
8 Bundle of bristles
9 Free front side
10 Thickened portion

The invention claimed is:

1. A brush comprising:
a brush head body which comprises a recess; and
a bundle of bristles passed through the recess of the brush head body, the bundle of bristles comprising a use side and a securing-side end, which is provided with a thickened portion for securing the bundle of bristles to the brush head body, and the bundle of bristles comprising a plurality of filaments made from a plastic material,
wherein the brush head body further comprises a front side through which the bundle of bristles passes at the use side, an opposing rear side which extends substantially parallel with the front side, and a collar provided at a distance from the front side of the brush head body,
wherein the collar circumferentially surrounds the bundle of bristles and has a free front side, the thickened portion of the bundle of bristles projecting radially over the free front side of the collar,
wherein the brush head body is made from the same plastic material as the filaments of the bundle of bristles and wherein the collar and the thickened portion of the bundle of bristles are bonded by way of being welded together during formation of the thickened portion, and wherein said recess extends through the brush head body between said free front side of said collar and said front side of the brush head body with a continuous shape and without step.

2. The brush according to claim 1, wherein the free front side of the collar is fully connected to the thickened portion by means of a melting process.

3. The brush according to claim 2, wherein the melt of the thickened portion is pressed against the collar.

4. The brush according to claim 1, wherein the collar has a conical outer circumferential surface.

5. The brush according to claim 1, wherein the free front side of the collar is provided between the front side of the brush head body and the rear side of the brush head body.

6. The brush according to claim 5, wherein said collar is surrounded by an annular gap arranged between the front side of the brush head body through which the bundle of bristles passes at the use side, and the rear side of the brush head body which extends substantially parallel therewith.

7. The brush according to claim 1, wherein the securing-side end of the bundle of bristles is arranged at a distance from a surface of the brush head body.

8. The brush according to claim 1, wherein the brush head body is provided with a coating at its rear side.

* * * * *